United States Patent
Oyasato

(10) Patent No.: US 10,133,519 B2
(45) Date of Patent: Nov. 20, 2018

(54) IMAGE FORMING APPARATUS, RECORDING MEDIUM THAT RECORDS A PROGRAM, AND INFORMATION PROCESSING SYSTEM THAT ARE CAPABLE OF DETECTING A POSSIBILITY THAT ERRONEOUS PRINTING OCCURS IN THE IMAGE FORMING APPARATUS

(71) Applicant: KYOCERA DOCUMENT SOLUTIONS INC., Osaka (JP)

(72) Inventor: Tomoki Oyasato, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 15/681,360

(22) Filed: Aug. 19, 2017

(65) Prior Publication Data
US 2018/0059997 A1 Mar. 1, 2018

(30) Foreign Application Priority Data

Aug. 26, 2016 (JP) .............................. 2016-165325

(51) Int. Cl.
*G06F 3/12* (2006.01)
*G06K 15/02* (2006.01)
*G06K 15/00* (2006.01)

(52) U.S. Cl.
CPC .......... *G06F 3/1208* (2013.01); *G06F 3/1262* (2013.01); *G06F 3/1298* (2013.01);
(Continued)

(58) Field of Classification Search
CPC ..................................................... G06F 3/1208
(Continued)

(56) References Cited

U.S. PATENT DOCUMENTS

| 2005/0068562 | A1* | 3/2005 | Ferlitsch | ............... | G06F 3/1208 |
| | | | | | 358/1.14 |
| 2007/0046995 | A1* | 3/2007 | Toda | ..................... | G06F 3/1204 |
| | | | | | 358/1.16 |

(Continued)

FOREIGN PATENT DOCUMENTS

JP 2001-113791 A 4/2001

*Primary Examiner* — Jacky X Zheng
(74) *Attorney, Agent, or Firm* — Li & Cai Intellectual Property (USA) Office

(57) ABSTRACT

An image forming apparatus includes: a processor that analyzes printable data to generate rendering data, renders the rendering data to generate image data, and acquires the number of pages of the image data, supplies the printable data to one or more external image forming apparatuses, and acquires, from each external image forming apparatuses, the number of pages of image data generated by the corresponding external image forming apparatus by analyzing the printable data to generate rendering data and rendering the generated rendering data, sorts the information processing apparatus itself and the one or more external image forming apparatuses into one or more groups of the same number of pages, and determines whether or not the information processing apparatus itself belongs to a group having the largest number of image forming apparatuses, and outputs the generated image data where the information processing apparatus itself belongs to the group.

7 Claims, 5 Drawing Sheets

(52) U.S. Cl.
CPC ..... G06K 15/1818 (2013.01); G06K 15/1848 (2013.01); G06K 15/405 (2013.01)

(58) Field of Classification Search
USPC ........................................................ 358/1.15
See application file for complete search history.

(56) References Cited

U.S. PATENT DOCUMENTS

| | | | |
|---|---|---|---|
| 2007/0236724 A1* | 10/2007 | Rai | G06F 3/1214 358/1.15 |
| 2009/0025003 A1* | 1/2009 | Rai | G06Q 10/0631 718/102 |

* cited by examiner

IMAGE FORMING APPARATUS, RECORDING MEDIUM THAT RECORDS A PROGRAM, AND INFORMATION PROCESSING SYSTEM THAT ARE CAPABLE OF DETECTING A POSSIBILITY THAT ERRONEOUS PRINTING OCCURS IN THE IMAGE FORMING APPARATUS

CROSS REFERENCE TO RELATED APPLICATION

This application claims the benefit of Japanese Priority Patent Application JP 2016-165325 filed Aug. 26, 2016, the entire contents of which are incorporated herein by reference.

BACKGROUND OF THE INVENTION

1. Field of the Invention

The present disclosure relates to an image forming apparatus, a recording medium that records a program, and an information processing system that are capable of detecting a possibility that erroneous printing such as garbled characters occurs in the image forming apparatus.

2. Description of Related Art

There is known a technology capable of detecting a possibility that erroneous printing such as garbled characters occurs in the image forming apparatus.

In the technology capable of detecting a possibility that erroneous printing such as garbled characters occurs in the image forming apparatus, it is desirable to more reliably detect the possibility that erroneous printing such as garbled characters occurs, and to be capable of detecting also the cause of erroneous printing such as garbled characters.

It is desirable to more reliably detect the possibility that erroneous printing such as garbled characters occurs, and to be capable of detecting also the cause of erroneous printing such as garbled characters in the image forming apparatus.

SUMMARY OF THE INVENTION

According to an embodiment of the present disclosure, an image forming apparatus includes:
a memory that stores an information processing program;
a processor that executes the information processing program; and
a communication device that communicates with one or more external image forming apparatuses, in which
when the processor executes the information processing program, the processor
analyzes printable data by an emulator to generate rendering data,
renders the rendering data to generate image data, and acquires the number of pages of the image data,
supplies the printable data to the one or more external image forming apparatuses, and acquires, from each of the one or more external image forming apparatuses, the number of pages of image data generated by the corresponding external image forming apparatus by analyzing the printable data to generate rendering data and rendering the generated rendering data,
sorts the information processing apparatus itself and the one or more external image forming apparatuses into one or more groups of the same number of pages, and determines whether or not the information processing apparatus itself belongs to a group having the largest number of image forming apparatuses, and
outputs the generated image data where the information processing apparatus itself belongs to the group having the largest number of image forming apparatuses.

According to an embodiment of the present disclosure, a non-transitory computer readable recording medium records an information processing program executable by a processor of an information processing apparatus, in which
the program causes the processor to:
analyze printable data by an emulator to generate rendering data,
render the rendering data to generate image data, and acquires the number of pages of the image data,
supply the printable data to the one or more external image forming apparatuses, and acquires, from each of the one or more external image forming apparatuses, the number of pages of image data generated by the corresponding external image forming apparatus by analyzing the printable data to generate rendering data and rendering the generated rendering data,
sort the information processing apparatus itself and the one or more external image forming apparatuses into one or more groups of the same number of pages, and determines whether or not the information processing apparatus itself belongs to a group having the largest number of image forming apparatuses, and
output the generated image data where the information processing apparatus itself belongs to the group having the largest number of image forming apparatuses.

According to an embodiment of the present disclosure, an information processing system includes:
a primary image forming apparatus; and
one or more external image forming apparatuses capable of communicating with the primary image forming apparatus,
the primary image forming apparatus including
a first memory that stores a first information processing program,
a first processor that executes the first information processing program, and
a first communication device that communicates with the one or more external image forming apparatuses,
the one or more external image forming apparatuses each including
a second memory that stores a second information processing program,
a second processor that executes the second information processing program, and
a second communication device that communicates with the primary image forming apparatus, wherein
when the first processor executes the first information processing program, the first processor
analyzes printable data by an emulator to generate rendering data,
renders the rendering data to generate image data, and acquires the number of pages of the image data, and
supplies the printable data to the one or more external image forming apparatuses, and requests each of the one or more external image forming apparatuses for the number of pages of image data generated by the corresponding external image forming apparatus by analyzing the printable data to generate rendering data and rendering the generated rendering data,
when the second processor executes the second information processing program, the second processor analyzes the printable data acquired from the primary image forming apparatus by an emulator to generate rendering data, renders the rendering data to generate image data, and acquires the number of pages of the image data, and supplies the number of pages of the image data to the primary image forming apparatus, and when the first processor executes the first information processing program, the first processor further acquires, from each of the one or more external image forming apparatuses, the number of pages of image data generated by the corresponding external image forming apparatus by rendering the printable data, sorts the primary information processing apparatus and the one or more external image forming apparatuses into one or more groups of the same number of pages, and determines whether or not the primary information processing apparatus belongs to a group having the largest number of image forming apparatuses, and outputs the generated image data where the primary information processing apparatus belongs to the group having the largest number of image forming apparatuses.

These and other objects, features and advantages of the present disclosure will become more apparent in light of the following detailed description of best mode embodiments thereof, as illustrated in the accompanying drawings

DETAILED DESCRIPTION OF THE PREFERRED EMBODIMENTS

Hereinafter, an embodiment of the present disclosure will be described with reference to the drawings.

1. Overview of Information Processing System

Figure 1:
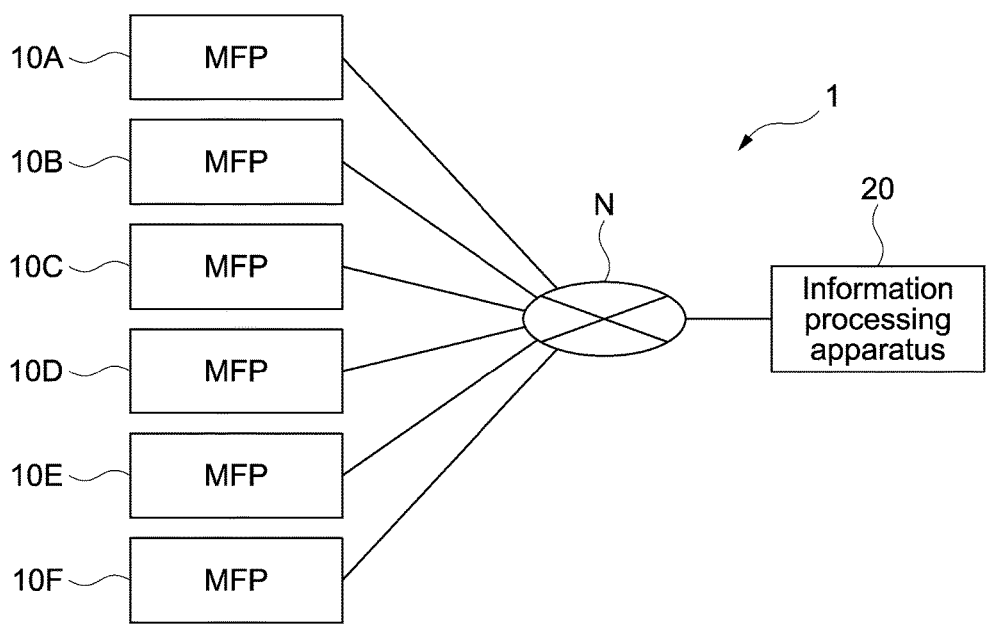
FIG. 1 schematically shows an information processing system according to an embodiment of the present disclosure.

FIG. 1 schematically shows an information processing system according to an embodiment of the present disclosure.

An information processing system 1 includes a plurality of image forming apparatuses (Multifunction Peripherals, hereinafter, referred to as MFPs) 10A to 10F and an information processing apparatus 20. The MFPs 10A to 10F and the information processing apparatus 20 are typically installed in an office.

The plurality of MFPs 10A to 10F are capable of communicating with each other via a network N. The network N is typically an in-office LAN (Local Area Network). In this example, the information processing system 1 including six MFPs 10A to 10F will be described.

The information processing apparatus 20 is, for example, a personal computer. The information processing apparatus 20 and at least one MFP10A are capable of communicating with each other via or not via the network N. In this example, the information processing apparatus 20 and the MFPs 10A to 10F are capable of communicating with each other via the network N.

The information processing apparatus 20 supplies printable data and a request for printing the printable data to the one MFP 10A. In the following description, the MFP 10A that has acquired the printable data and the print request from the information processing apparatus 20 is referred to as "primary MFP" (primary image forming apparatus, image forming apparatus itself), and the other MFPs 10B to 10F are referred to as "external MFPs" (external image forming apparatuses).

Figure 2:
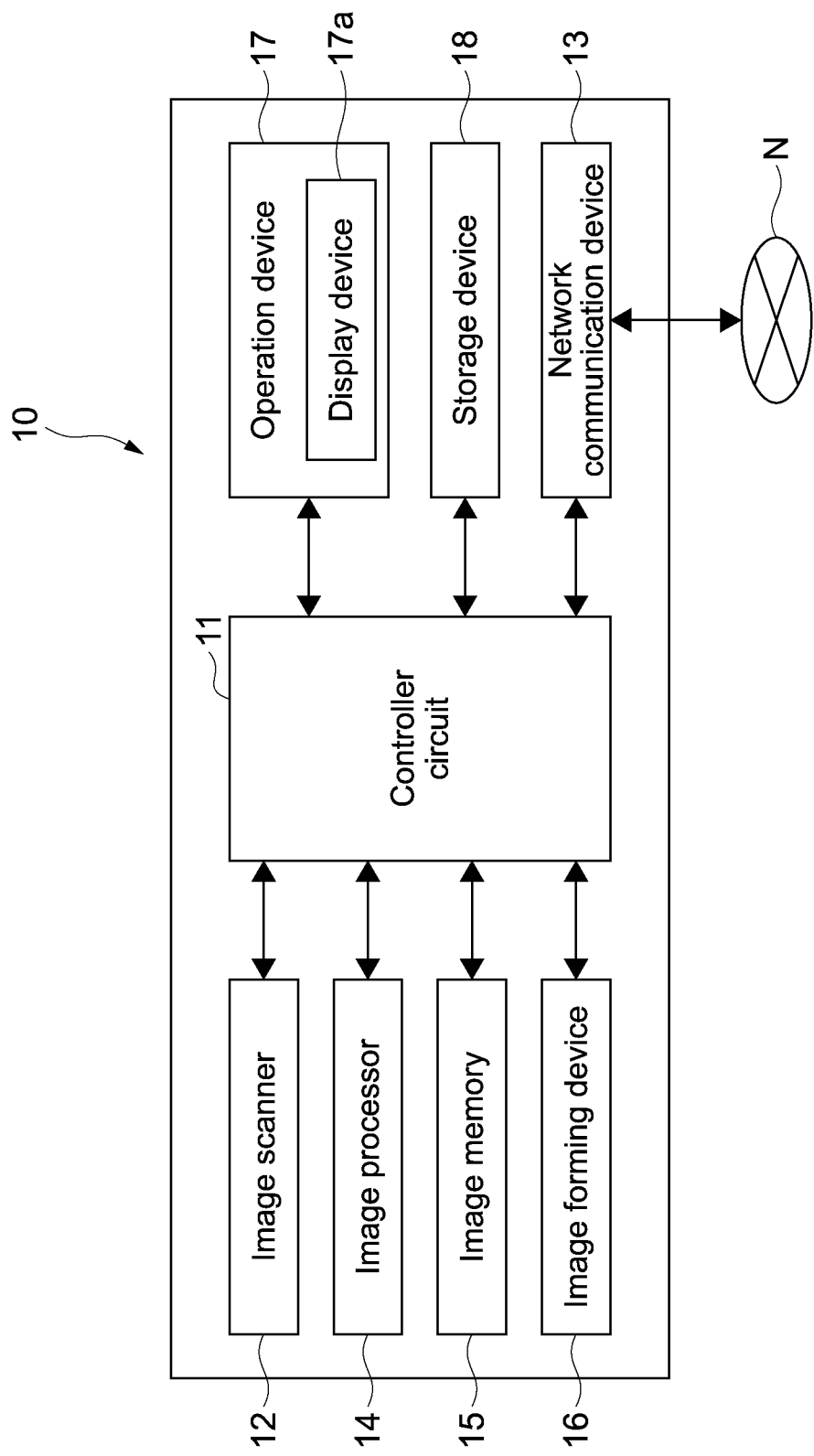
FIG. 2 shows a hardware configuration of an image forming apparatus.

2. Hardware Configuration 2-1. Hardware Configuration of Image Forming Apparatus FIG. 2 shows a hardware configuration of an image forming apparatus.

Hardware configurations of the MFPs 10A to 10F may be the same or different. Now, a hardware configuration of a typical MFP 10 will be described without distinguishing the MFPs 10A to 10F.

The MFP 10 includes a control circuit 11. The control circuit 11 includes a CPU (Central Processing Unit), a RAM (Random Access Memory), a ROM (Read Only Memory), dedicated hardware circuits, and the like and performs overall operational control of the MFP 10. A computer program that causes the MFP 10 to operate as the respective functional units (to be described later) is recorded in a non-transitory computer readable recording medium (memory) such as a ROM.

The controller circuit 11 is connected to an image scanner 12, an image processor 14, an image memory 15, an image forming device 16, an operation device 17, a storage device 18, a network communication device 13, and the like. The controller circuit 11 performs operational control of the respective devices connected thereto and sends/receives signals and data to/from those devices.

According to job execution instructions input by a user via the operation device 17 or a personal computer (not shown) connected to the network N, the controller circuit 11 controls drive and processing of mechanisms requisite for executing operational control of functions such as a scanner function, a printing function, and a copy function.

The image scanner 12 reads an image from a script.

The image processor 14 carries out image processing as necessary on image data of an image read by the image scanner 12. For example, the image processor 14 corrects shading of an image read by the image scanner 12 and carries out other image processing to improve the quality of the image to be formed.

The image memory 15 includes an area that temporarily stores data of a script image read by the image scanner 12 or data to be printed by the image forming device 16.

The operation device 17 includes a touch panel device and an operation key device that accept user's instructions on various operations and processing executable by the MFP 10. The touch panel device includes a display device 17a such as an LCD (Liquid Crystal Display) equipped with a touch panel.

The network communication device 13 is an interface used for connecting to the network N.

The image forming device 16 prints an image on a sheet or the like based on the image data.

The storage device 18 is a large-volume storage device such as an HDD (Hard Disk Drive) that stores a script image read by the image scanner 12, and the like.

2-2. Hardware Configuration of Information Processing Apparatus

The information processing apparatus 20 is a typical information processing apparatus such as a personal computer, a tablet-type computer, and a smartphone, and illustration of the hardware configuration thereof will be omitted. The CPU (Central Processing Unit) of the information processing apparatus 20 loads a program recorded in a ROM (Read Only Memory) in a RAM (Random Access Memory) and executes the program. The information processing apparatus 20 supplies printable data described using a page description language (PDL) and a request for printing the printable data to the MFP 10 via the network N.

Figure 3:
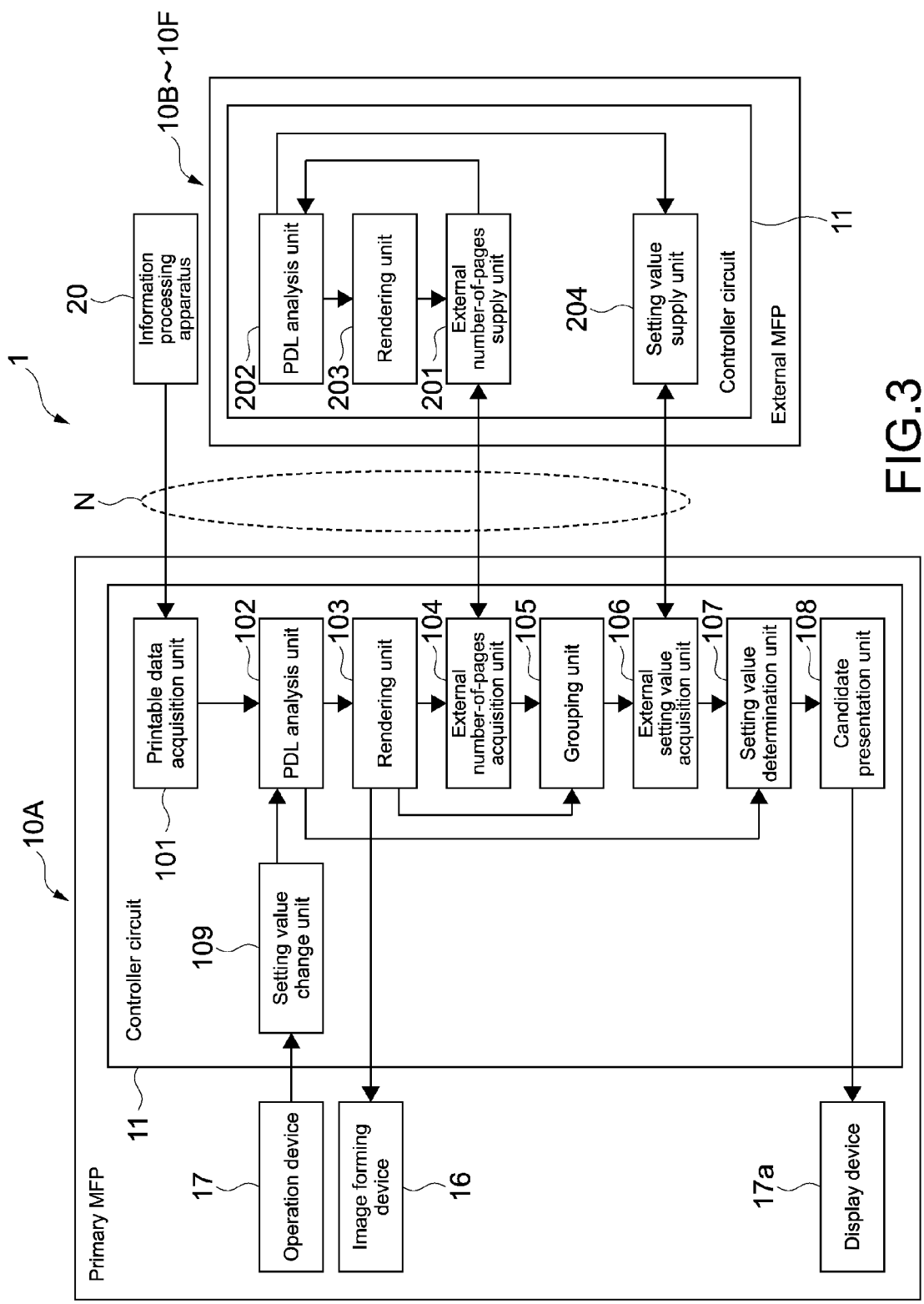
FIG. 3 shows functional configurations of a primary image forming apparatus and an external image forming apparatus.

3. Functional Configurations of Primary Image Forming Apparatus and External Image Forming Apparatus FIG. 3 shows functional configurations of a primary image forming apparatus and an external image forming apparatus.

The processor (first processor) of the control circuit 11 of the primary MFP 10A loads an information processing program recorded in a ROM (first memory), which is an example of a non-transitory computer readable recording medium, in a RAM and executes the program to thereby operate as the functional blocks, i.e., a printable data acquisition unit 101, a PDL analysis unit 102, a rendering unit 103, an external number-of-pages acquisition unit 104, a grouping unit 105, an external setting value acquisition unit 106, a setting value determination unit 107, a candidate presentation unit 108, and a setting value change unit 109.

The processor (second processor) of the control circuit 11 of the respective external MFP 10B to 10F loads an information processing program recorded in a ROM (second memory), which is an example of a non-transitory computer readable recording medium, in a RAM and executes the program to thereby operate as the functional blocks, i.e., an external number-of-pages supply unit 201, a PDL analysis unit 202, a rendering unit 203, and an setting value supply unit 204.

The printable data acquisition unit 101 acquires printable data described using a page description language (PDL) and a request for printing the printable data from the information processing apparatus 20 via the network N.

The PDL analysis units 102 and 202 each analyze the printable data by an emulator to generate rendering data. In the present embodiment, the rendering data is intermediate data for generating image data in a bitmap format. In the rendering data, character codes in the printable data are converted into corresponding characters, rendering commands in the printable data are converted into graphics, and images in a bitmap format in the printable data are compressed. Characters, graphics, and images are included in the rendering data in a format that can be expanded into image data.

The rendering units 103 and 203 each render rendering data to generate image data (bitmap data).

The external number-of-pages acquisition unit 104 supplies printable data to the external MFPs 10B to 10F connected to the network N by broadcasting or multicasting, and requests and acquires the number of pages of the image data generated by rendering the printable data.

The external number-of-pages supply unit 201 acquires the printable data and the request for supplying the number-of-pages from the primary MFP 10A via the network N. The external number-of-pages supply unit 201 supplies the number of pages of the image data to the primary MFP 10A via the network N.

The grouping unit 105 sorts the primary MFP 10A and the external MFPs 10B to 10F into one or more groups of the same number of pages. The grouping unit 105 determines whether or not the primary MFP 10A belongs to the group having the largest number of MFPs.

The external setting value acquisition unit 106 requests and acquires a setting value (setting value of the emulator) set in specific setting information in the external MFPs 10C, 10D, and 10F that belong to the group having the largest number of MFPs via the network N.

The setting value supply unit 204 acquires a request for supplying a setting value from the primary MFP 10A via the network N. The setting value supply unit 204 reads the setting value of the emulator of the PDL analysis unit 202 and supplies the read setting value to the primary MFP 10A via the network N.

The setting value determination unit 107 determines whether or not any of the setting values of the emulator acquired from the external MFPs 10C, 10D, and 10F is the same as the setting value of the emulator set in the primary MFP 10A.

The candidate presentation unit 108 presents at least any one of the external MFPs 10C, 10D, and 10F as a candidate expected to output (print) image data instead of the primary MFP 10A. Alternatively, the candidate presentation unit 108 presents the setting value of the emulator of the at least one of the external MFPs 10C, 10D, and 10F as a candidate expected to be set in the PDL analysis unit 102 of the primary MFP 10A.

The setting value change unit 109 changes the setting value of the emulator of the PDL analysis unit 102.

Figure 4:
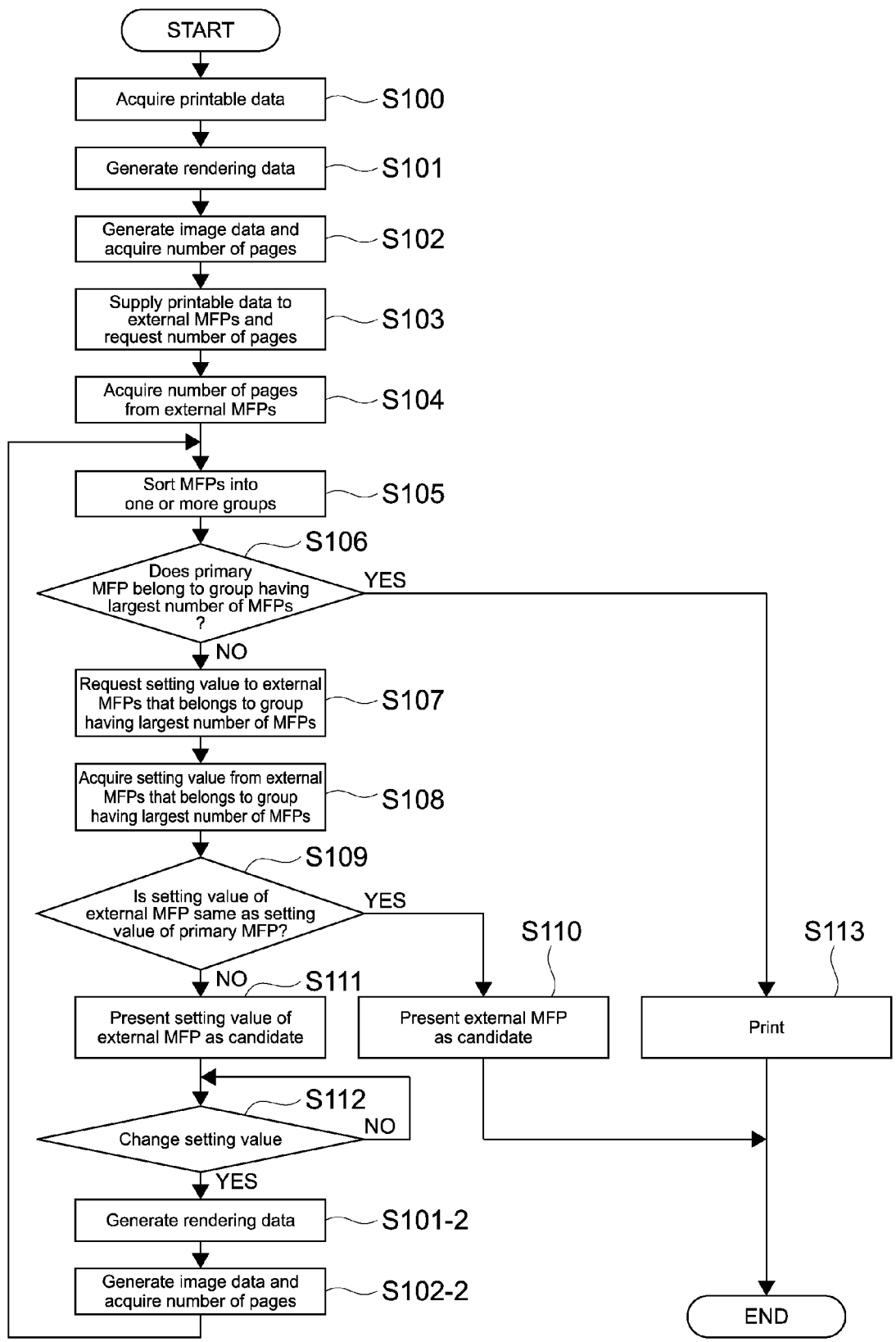
FIG. 4 shows an operation of the primary image forming apparatus.
Figure 5:
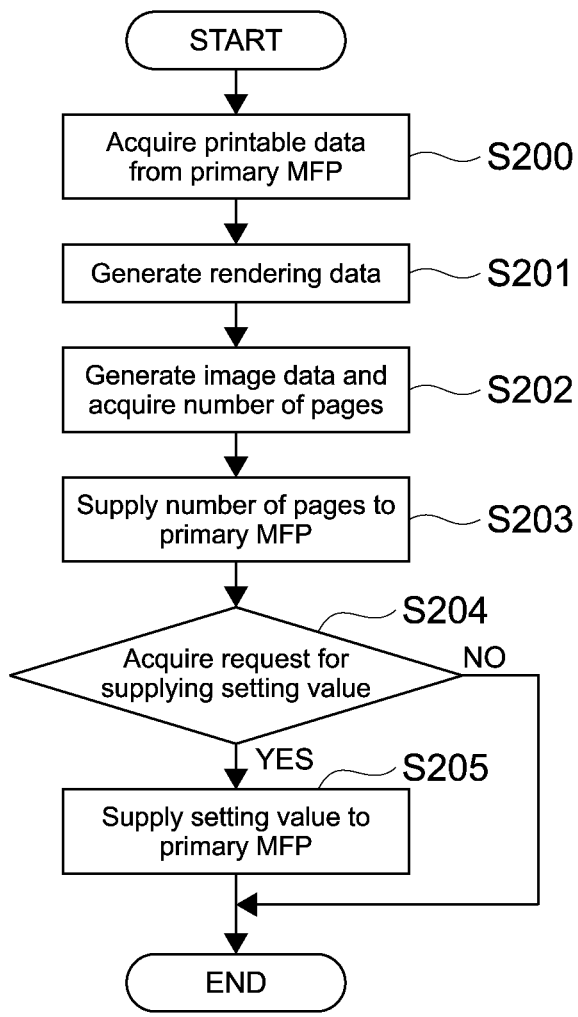
FIG. 5 shows an operation of the external image forming apparatus.

4. Operations of Primary Image Forming Apparatus and External Image Forming Apparatus FIG. 4 shows an operation of the primary image forming apparatus. FIG. 5 shows an operation of the external image forming apparatus.

The information processing apparatus 20 supplies printable data described using a page description language (PDL) and a request for printing the printable data to the primary MFP 10A via the network N.

The printable data acquisition unit 101 of the primary MFP 10A acquires the printable data and the request for printing the printable data from the information processing apparatus 20 via the network N (Step S100). The printable data acquisition unit 101 supplies the printable data acquired from the information processing apparatus 20 to the PDL analysis unit 102.

The PDL analysis unit 102 of the primary MFP 10A analyzes the printable data acquired from the printable data acquisition unit 101 by the emulator to generate rendering data (Step S101). The PDL analysis unit 102 supplies the generated rendering data to the rendering unit 103.

The rendering unit 103 of the primary MFP 10A renders the rendering data acquired from the PDL analysis unit 102 to generate image data (bitmap data). The rendering unit 103 acquires the number of pages of the generated image data (Step S102). The rendering unit 103 supplies the printable data to the external number-of-pages acquisition unit 104, and supplies the number of pages to the grouping unit 105.

The external number-of-pages acquisition unit 104 of the primary MFP 10A acquires the printable data. The external number-of-pages acquisition unit 104 supplies the printable data to the external MFPs 10B to 10F connected to the network N by broadcasting or multicasting, and requests (request for supplying the number of pages) the number of pages of image data generated by rendering the printable data (Step S103).

The external number-of-pages supply unit 201 of each of the external MFPs 10B to 10F acquires the printable data and the request for supplying the number of pages from the primary MFP 10A via the network N (Step S200). The external number-of-pages supply unit 201 supplies the printable data acquired from the primary MFP 10A to the PDL analysis unit 202.

The PDL analysis unit 202 (external PDL analysis unit) of each of the external MFPs 10B to 10F analyzes the printable data acquired from the external number-of-pages supply unit 201 by the emulator to generate rendering data (Step S201). The PDL analysis unit 202 supplies the generated rendering data to the rendering unit 203.

The rendering unit 203 (external rendering unit) of each of the external MFPs 10B to 10F renders the rendering data acquired from the PDL analysis unit 202 to generate image data (bitmap data). The rendering unit 203 acquires the number of pages of the generated image data (Step S202). The rendering unit 203 supplies the number of pages of the image data to the external number-of-pages supply unit 201.

The external number-of-pages supply unit 201 of each of the external MFPs 10B to 10F supplies, to the primary MFP 10A via the network N, the number of pages of the image data generated by the rendering unit 203 by rendering the printable data (Step S203).

The external number-of-pages acquisition unit 104 of the primary MFP 10A acquires, from each of the external MFPs 10B to 10F via the network N, the number of pages of the image data generated by each of the external MFPs 10B to 10F by rendering the printable data (Step S104). The external number-of-pages acquisition unit 104 supplies the number of pages acquired from each of the external MFPs 10B to 10F to the grouping unit 105.

The grouping unit 105 of the primary MFP 10A acquires the number of pages of the image data generated by the rendering unit 103 of the primary MFP 10A, and the number of pages acquired by the external number-of-pages acquisition unit 104 from each of the external MFPs 10B to 10F.

In the case where the PDL analysis unit 102 cannot normally interpret a character code, a rendering command, and an image, erroneous printing occurs. In this case, for example, the character code, the rendering command, and the image are replaced with meaningless alphabets or symbols. Thus, garbled characters occur, and erroneous characters are listed in the image data. As a result, the number of pages of the image data may be changed.

In this example, the number of pages of image data generated by the primary MFP 10A and the number of pages of image data generated by each of the external MFPs 10B to 10F are as follows.

Primary MFP 10A: 9 pages
External MFP 10B: 8 pages
External MFP 10C: 3 pages
External MFP 10D: 3 pages
External MFP 10E: 9 pages
External MFP 10F: 3 pages The grouping unit 105 sorts the primary MFP 10A and the external MFPs 10B to 10F into one or more groups of the same number of pages (Step S105).

In this example, the grouping unit 105 sorts the primary MFP 10A and the external MFPs 10B to 10F as follows.

Group of 3 pages: external MFPs 10C, 10D, and 10F
Group of 9 pages: primary MFP 10A and external MFP 10E
Group of 8 pages: external MFP 10B

The grouping unit 105 determines whether or not the primary MFP 10A belongs to the group having the largest number of MFPs (Step S106). The MFP that belongs to "the group having the largest number of MFPs" is considered to be capable of obtaining a correct (no garbled character etc.) print result. Meanwhile, it is considered that erroneous printing such as garbled characters may occur in the MFPs that belong to other groups.

In this example, the number of MFPs that belong to the respective groups is as follows.

Group of 3 pages: 3 MFPs
Group of 9 pages: 2 MFPs
Group of 8 pages: 1 MFPs

In this example, "the group having the largest number of MFPs" is the "group of 3 pages" to which three MFPs belong. Meanwhile, the primary MFP 10A belongs to the "group of 9 pages". Since the number of MFPs that belong to the "group of 9 pages" is two, the primary MFP 10A does not belong to "the group having the largest number of MFPs". Therefore, the grouping unit 105 determines that the primary MFP 10A does not belong to the group having the largest number of MFPs (in other words, erroneous printing such as garbled characters may occur in the primary MFP 10A) (NO in Step S106). Then, the grouping unit 105 notifies the external setting value acquisition unit 106 of the external MFP that belongs to "the group having the largest number of MFPs". In this example, the grouping unit 105 notifies the external setting value acquisition unit 106 of the external MFPs 10C, 10D, and 10F that belong to the "group of 3 pages".

The external setting value acquisition unit 106 of the primary MFP 10A is notified of the external MFPs 10C, 10D, and 10F from the grouping unit 105. The external setting value acquisition unit 106 requests a setting value (request for supplying a setting value) set in specific setting information to the external MFPs 10C, 10D, and 10F via the network N (Step S107). In this example, the "setting value set in specific setting information" is the setting value of the emulator.

The setting value supply unit 204 of each of the external MFPs 10C, 10D, and 10F acquires the request for supplying a setting value from the primary MFP 10A via the network N (Yes in Step S204). The setting value supply unit 204 reads the setting value of the emulator of the PDL analysis unit 202 and supplies the read setting value to the primary MFP 10A via the network N (Step S205).

The external setting value acquisition unit 106 of the primary MFP 10A acquires the setting value of the emulator from each of the external MFPs 10C, 10D, and 10F via the network N (Step S108). The external setting value acquisition unit 106 supplies the setting value of the emulator acquired from each of the external MFPs 10C, 10D, and 10F to the setting value determination unit 107.

The setting value determination unit 107 of the primary MFP 10A acquires setting values of the emulators of the external MFPs 10C, 10D, and 10F from the external setting value acquisition unit 106. The setting value determination unit 107 reads the setting value of the emulator of the PDL analysis unit 102 of the primary MFP 10A. The setting value determination unit 107 determines whether or not any of the setting values of the emulators acquired from the external MFPs 10C, 10D, and 10F is the same as the setting value of the emulator set in the primary MFP 10A (Step S109). The setting value determination unit 107 notifies the candidate presentation unit 108 of the determination result.

The case where the setting value determination unit 107 determines that any of the setting values of the emulators acquired from the external MFPs 10C, 10D, and 10F is the same as the setting value of the emulator set in the primary MFP 10A (YES in Step S109) will be described. Since the primary MFP 10A does not belong to "the group having the largest number of MFPs" (NO in Step S106), erroneous printing such as garbled characters may occur. However, since any of the setting values of the emulators of the external MFPs 10C, 10D, and 10F is the same as the setting value of the emulator set in the primary MFP 10A, the cause of the erroneous printing is not the setting value of the emulator. In other words, the cause of erroneous printing that may occur in the primary MFP 10A is unknown. In this regard, the candidate presentation unit 108 presents (displays, on the display device 17a) at least any one (or all) of the external MFPs 10C, 10D, and 10F, as a candidate that is expected to output (print) image data instead of the primary MFP 10A (Step S110). In other words, the candidate presentation unit 108 presents (displays, on the display device 17a) to the user to perform output (printing) by using any of the external MFPs 10C, 10D, and 10F instead of the primary MFP 10A.

Now, the case where the setting value determination unit 107 determines that all the setting values of the emulators acquired from the external MFPs 10C, 10D, and 10F are different from the setting value of the emulator set in the primary MFP 10A (NO in Step S109) will be described. Since the primary MFP 10A does not belong to "the group having the largest number of MFPs" (NO in Step S106), erroneous printing such as garbled characters may occur. However, by changing the setting value of the emulator of the primary MFP 10A to the setting value of one of the emulators of the external MFPs 10C, 10D, and 10F, a correct (no garbled character etc.) print result may be obtained in the primary MFP 10A. In this regard, the candidate presentation unit 108 presents (displays, on the display device 17a) the setting values of the emulators of the external MFPs 10C, 10D, and 10F as candidates expected to be set in the PDL analysis unit 102 of the primary MFP 10A (Step S111).

In the case where all the setting values of the emulators of the external MFPs 10C, 10D, and 10F are the same, the candidate presentation unit 108 presents, as a candidate, the same setting value. Meanwhile, a part or all of the setting values of the emulators of the external MFPs 10C, 10D, and 10F are different, the candidate presentation unit 108 only needs to present at least any one of (or all) the setting values as a candidate. Even in the case where any setting value is set in the primary MFP 10A, it is expected that a correct print result (3 pages) will be output. Therefore, any of the setting values may be presented as a candidate even in the case where a part or all of the setting values of the emulators of the external MFPs 10C, 10D, and 10F are different.

The user selects any of the setting values as the setting value of the emulator of the PDL analysis unit 102 by referring to the setting value of the emulator presented (displayed on the display device 17a) as a candidate expected to be set in the PDL analysis unit 102 of the primary MFP 10A and operating the operation device 17, for example. The setting value change unit 109 of the primary MFP 10A recognizes a specific operation via the operation device 17 by the user as a request for changing the setting value of the emulator, and changes the setting value of the emulator of the PDL analysis unit 102 (YES in Step S112).

When accepting the request for changing the setting value of the emulator, the PDL analysis unit 102 of the primary MFP 10A analyzes the printable data by the emulator to regenerate rendering data (Step S101-2). The PDL analysis unit 102 supplies the regenerated rendering data to the rendering unit 103.

The rendering unit 103 of the primary MFP 10A renders the rendering data acquired from the PDL analysis unit 102 to newly generate image data (bitmap data), and acquires the number of pages of the newly generated image data (Step S102-2). The rendering unit 103 supplies the number of pages of the newly generated image data to the grouping unit 105.

The grouping unit 105 of the primary MFP 10A acquires the number of pages of the image data newly generated by the rendering unit 103. The grouping unit 105 uses the number of pages newly acquired by the PDL analysis unit 102 as the number of pages for the primary MFP 10A, and sorts the primary MFP 10A and the external MFPs 10B to 10F into one or more groups of the same number of pages again (Step S105). The grouping unit 105 determines whether or not the primary MFP 10A belongs to the group having the largest number of MFPs again (Step S106).

In the case where the grouping unit 105 determines that the primary MFP 10A belongs to the group having the largest number of MFPs (YES in Step S106), the image forming device 16 (output device) prints (outputs) an image on a sheet (Step S113) based on image data generated by the rendering unit 103 by rendering the rendering data (Step S102-2). This is because the primary MFP 10A that belongs to "the group having the largest number of MFPs" is considered to obtain a correct (no garbled character etc.) print result.

Note that also in the case where the grouping unit 105 determines that the primary MFP 10A belongs to the group having the largest number of MFPs for the first time (YES in Step S106), the image forming device 16 prints (outputs) an image on a sheet (Step S113) based on image data generated by the rendering unit 103 by rendering the rendering data (Step S102).

5. Conclusion

According to the present embodiment, the primary MFP 10A analyzes the printable data by the emulator to generate rendering data, renders the generated rendering data to generate image data, and acquires the number of pages of the image data. The primary MFP 10A supplies the printable data to the external MFPs 10B to 10F. The external MFPs 10B to 10F analyze the printable data by the respective emulators to generate rendering data, and render the generated rendering data to generate image data. The primary MFP 10A acquires the number of pages of the image data from each of the external MFPs 10B to 10F. The primary MFP 10A sorts the primary MFP 10A and the external MFPs 10B to 10F into one or more groups of the same number of pages, and determines whether or not the primary MFP 10A belongs to the group having the largest number of MFPs. In the case where the primary MFP 10A belongs to "the group having the largest number of MFPs", the primary MFP 10A is considered to obtain a correct (no garbled character etc.) print result. Meanwhile, in the case where the primary MFP 10A does not belong to the "group having the largest number of MFPs", erroneous printing such as garbled characters may occur in the primary MFP 10A.

In this regard, for example, as a possible method, spool data generated from the printable data by an information processing apparatus is compared with spool data generated by another information processing apparatus and the possibility of erroneous printing is detected by the information processing apparatus. However, in this method, since the information processing apparatus detects the possibility of erroneous printing based on the printable data, whether or not there is a possibility that erroneous printing will occur in the final image data (bitmap data) to be printed cannot be determined. Meanwhile, according to the present embodiment, by the primary MFP 10A by comparing the number of pages of the final image data (bitmap data) to be printed, it is possible to more reliably detect the possibility of erroneous printing such as garbled characters as compared with the case of making the determination based on the printable data.

According to the present embodiment, in the case where the primary MFP 10A does not belong to "the group having the largest number of MFPs" (that is, erroneous printing such as garbled characters may occur in the primary MFP 10A), the primary MFP 10A acquires the setting value of the emulator from each of the external MFPs 10C, 10D, and 10F that belong to the group having the largest number of MFPs. In the case where any one of the setting values acquired from the external MFPs 10C, 10D, and 10F is the same as the setting value set in the primary MFP 10A, the cause of erroneous printing that may occur in the primary MFP 10A is not the setting value of the emulator. In other words, the cause of erroneous printing that may occur in the primary MFP 10A is unknown. In this case, the primary MFP 10A presents at least any one of the external MFPs 10C, 10D, and 10F as a candidate expected to output image data instead of the primary MFP 10A. As a result, even in the case where the cause of erroneous printing that may occur in the primary MFP 10A is unknown, the user can select any of the external MFPs 10C, 10D, and 10F, and it is possible to correctly perform printing by using the selected external MFP before erroneous printing actually occurs in the primary MFP 10A.

According to the present embodiment, in the case where all the setting values acquired from the external MFPs 10C, 10D, and 10F are different from the setting value set in the primary MFP 10A, a correct (no garbled character etc.) print result may be obtained in the primary MFP 10A by changing the setting value of the emulator of the primary MFP 10A to any of the setting values of the emulators of the external MFPs 10C, 10D, and 10F. In this regard, the candidate presentation unit 108 presents (displays, on the display device 17a) the setting values of the emulators of the external MFPs 10C, 10D, and 10F as candidates expected to be set in the PDL analysis unit 102 of the primary MFP 10A. As a result, the user can know the cause of erroneous printing (erroneous setting value of the emulator) that may occur in the primary MFP 10A, and it is possible to change the setting value of the emulator of the primary MFP 10A before erroneous printing actually occurs, and correctly perform printing by using the primary MFP 10A. Further, since the primary MFP 10A determines whether the primary MFP 10A belongs to the group having the largest number of MFPs again after the setting value of the emulator is changed, it is possible to detect whether or not erroneous printing such as garbled characters occurs, again.

6. Supplementary Note

When acquiring the number of pages of image data from the external MFPs 10B to 10F connected to the network N, the external number-of-pages acquisition unit 104 of the primary MFP 10A may acquire the number of pages from all the external MFPs 10B to 10F connected to the network N. Alternatively, when the number of external MFPs 10 from which the number of pages is acquired reaches a specific threshold value, the external number-of-pages acquisition unit 104 may stop acquiring the number of pages.

When sorting the primary MFP 10A and the external MFPs 10B to 10F into one or more groups of the same number of pages, the grouping unit 105 of the primary MFP 10A may exclude the MFP with the number of pages exceeding a specific threshold value from the grouping target. This is because the number of pages is large in the case of erroneous printing due to garbled characters in many cases. Further, the grouping unit 105 excludes the MFP in which erroneous printing occurs from the grouping target.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming apparatus, comprising:
a memory that stores an information processing program;
a processor that executes the information processing program; and
a communication device that communicates with one or more external image forming apparatuses, wherein
when the processor executes the information processing program, the processor
analyzes printable data by an emulator to generate rendering data,
renders the rendering data to generate image data, and acquires the number of pages of the image data,
supplies the same printable data to the one or more external image forming apparatuses, and acquires, from each of the one or more external image forming apparatuses, the number of pages of image data generated by the corresponding external image forming apparatus by analyzing the same printable data to generate rendering data and rendering the generated rendering data,
sorts the image forming apparatus itself and the one or more external image forming apparatuses into one or more groups on a basis of the number of pages of the generated image data,
each of the one or more groups including one or more image forming apparatuses that generated, from the same printable data, image data having the same number of pages,
the number of pages of the image data generated by the one or more image forming apparatuses of each of the one or more groups being different from the number of pages of the image data generated by the one or more image forming apparatuses of the rest of the one or more groups,
determines whether or not the image forming apparatus itself belongs to a group having the largest number of image forming apparatuses, and
outputs the generated image data where the image forming apparatus itself belongs to the group having the largest number of image forming apparatuses.

2. The image forming apparatus according to claim 1, wherein
when the processor executes the information processing program, the processor
acquires one or more setting values set in specific setting information from one or more image forming apparatuses that belong to the group having the largest number of image forming apparatuses where the image forming apparatus itself does not belong to the group having the largest number of image forming apparatuses,
determines whether or not any of the one or more setting values acquired from the one or more image forming apparatuses is the same as a setting value set in the image forming apparatus itself, and
presents at least one of the one or more image forming apparatuses that belong to the group having the largest number of image forming apparatuses as a candidate expected to output the image data instead of the image forming apparatus itself where any of the one or more setting values acquired from the one or more image forming apparatuses is the same as the setting value set in the image forming apparatus itself.

3. The image forming apparatus according to claim 2, wherein
when the processor executes the information processing program, the processor
presents at least any one of the one or more setting values acquired from the one or more external image forming apparatuses as a candidate expected to be set in the image forming apparatus itself where all the one or more setting values acquired from the one or more image forming apparatuses are different from the setting value set in the image forming apparatus itself.

4. The image forming apparatus according to claim 3, wherein
when the processor executes the information processing program, the processor
changes the setting value of the image forming apparatus itself by setting any of the one or more setting values presented as the candidate,
after changing the setting value of the image forming apparatus itself,
analyzes the printable data by the emulator to regenerate rendering data,
renders the regenerated rendering data to newly generate image data, and acquires the number of pages of the newly generated image data, and
uses the newly acquired number of pages as the number of pages for the image forming apparatus itself, sorts the image forming apparatus itself and the one or more external image forming apparatuses into one or more groups of the same number of pages, and determines whether or not the image forming apparatus itself belongs to the group having the largest number of image forming apparatuses.

5. The image forming apparatus according to claim 2, wherein
the setting value set in the specific setting information is a setting value of the emulator.

6. A non-transitory computer readable recording medium that records an information processing program executable by a processor of an image forming apparatus, wherein
the program causes the processor to:
analyze printable data by an emulator to generate rendering data,
render the rendering data to generate image data, and acquires the number of pages of the image data,
supply the same printable data to the one or more external image forming apparatuses, and acquires, from each of the one or more external image forming apparatuses, the number of pages of image data generated by the corresponding external image forming apparatus by analyzing the same printable data to generate rendering data and rendering the generated rendering data,
sort the image forming apparatus itself and the one or more external image forming apparatuses into one or more groups on a basis of the same number of pages of the generated image data,
each of the one or more groups including one or more image forming apparatuses that generated, from the same printable data, image data having the same number of pages,
the number of pages of the image data generated by the one or more image forming apparatuses of each of the one or more groups being different from the number of pages of the image data generated by the one or more image forming apparatuses of the rest of the one or more groups,
determines whether or not the image forming apparatus itself belongs to a group having the largest number of image forming apparatuses, and
output the generated image data where the image forming apparatus itself belongs to the group having the largest number of image forming apparatuses.

7. An information processing system, comprising:
a primary image forming apparatus; and
one or more external image forming apparatuses capable of communicating with the primary image forming apparatus,
the primary image forming apparatus including
a first memory that stores a first information processing program,
a first processor that executes the first information processing program, and
a first communication device that communicates with the one or more external image forming apparatuses,
the one or more external image forming apparatuses each including
a second memory that stores a second information processing program,
a second processor that executes the second information processing program, and
a second communication device that communicates with the primary image forming apparatus, wherein
when the first processor executes the first information processing program, the first processor
analyzes printable data by an emulator to generate rendering data,
renders the rendering data to generate image data, and acquires the number of pages of the image data, and
supplies the same printable data to the one or more external image forming apparatuses, and requests each of the one or more external image forming apparatuses for the number of pages of image data generated by the corresponding external image forming apparatus by analyzing the same printable data to generate rendering data and rendering the generated rendering data,
when the second processor executes the second information processing program, the second processor
analyzes the printable data acquired from the primary image forming apparatus by an emulator to generate rendering data,
renders the rendering data to generate image data, and acquires the number of pages of the image data, and
supplies the number of pages of the image data to the primary image forming apparatus, and
when the first processor executes the first information processing program, the first processor further
acquires, from each of the one or more external image forming apparatuses, the number of pages of image data generated by the corresponding external image forming apparatus by rendering the printable data, sorts the primary image forming apparatus and the one or more external image forming apparatuses into one or more groups on a basis of the number of pages of the generated image data,
  each of the one or more groups including one or more image forming apparatuses that generated, from the same printable data, image data having the same number of pages,
  the number of pages of the image data generated by the one or more image forming apparatuses of each of the one or more groups being different from the number of pages of the image data generated by the one or more image forming apparatuses of the rest of the one or more groups,
determines whether or not the primary image forming apparatus belongs to a group having the largest number of image forming apparatuses, and
outputs the generated image data where the primary image forming apparatus belongs to the group having the largest number of image forming apparatuses.

* * * * *